(12) United States Patent
Narukawa

(10) Patent No.: US 11,852,759 B2
(45) Date of Patent: Dec. 26, 2023

(54) RADIATION DETECTOR

(71) Applicant: FUJIFILM Corporation, Tokyo (JP)

(72) Inventor: Yasunori Narukawa, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/819,193

(22) Filed: Aug. 11, 2022

(65) Prior Publication Data

US 2023/0059764 A1    Feb. 23, 2023

(30) Foreign Application Priority Data

Aug. 23, 2021    (JP) .................. 2021-135896

(51) Int. Cl.
*G01T 1/20*    (2006.01)

(52) U.S. Cl.
CPC .......... *G01T 1/2006* (2013.01); *G01T 1/2002* (2013.01)

(58) Field of Classification Search
CPC ............................. G01T 1/2006; G01T 1/2002
See application file for complete search history.

(56) References Cited

U.S. PATENT DOCUMENTS

2017/0045630 A1*   2/2017   Simon ................. G01T 1/20181
2017/0236609 A1    8/2017   Tanino et al.

FOREIGN PATENT DOCUMENTS

WO        2016/021540 A1     2/2016

* cited by examiner

*Primary Examiner* — Hugh Maupin
(74) *Attorney, Agent, or Firm* — Studebaker & Brackett PC

(57) ABSTRACT

A radiation detector includes a scintillator that has a first surface on which radiation is incident and a second surface disposed on a side opposite to the first surface, and that converts the radiation into fluorescence; a sensor unit provided on a side of the second surface of the scintillator and having a light receiving surface that receives the fluorescence converted by the scintillator; and a plurality of members that reflect or absorb the fluorescence converted by the scintillator. Each of the plurality of members has an elongated shape having a longitudinal direction in a direction intersecting the light receiving surface of the sensor unit, and is provided in the scintillator at a position closer to the second surface than to the first surface.

7 Claims, 9 Drawing Sheets

RADIATION DETECTOR

CROSS-REFERENCE TO RELATED APPLICATIONS

The present application claims priority under 35 U.S.C. § 119 to Japanese Patent Application No. 2021-135896 filed on Aug. 23, 2021. The above application is hereby expressly incorporated by reference, in its entirety, into the present application.

BACKGROUND

1. Technical Field

The present disclosure relates to a radiation detector.

2. Description of the Related Art

Generally, there is known a radiation transmission image capturing device that captures a radiation transmission image of an imaging target by detecting radiation emitted from a radiation source and transmitted through the imaging target via a radiation detector. In addition, there is known a technique for capturing a highly sharp image as a radiation transmission image. For example, WO2016/021540A discloses a technique in which a scintillator panel in which a partition wall is provided on a sensor substrate provided with a sensor that receives fluorescence and a cell comparted by the partition wall is filled with a phosphor is used as a scintillator that converts radiation into fluorescence, for a radiation detector. According to the technique disclosed in WO2016/021540A, it is possible to obtain a highly sharp radiation transmission image because the fluorescence converted from radiation by the scintillator can be restrained from being scattered by the partition wall and can be guided to the sensor.

SUMMARY

Meanwhile, non-destructive inspection using radiation has been generally performed. As a technique related to the non-destructive inspection, a technique has been performed in which radiation is emitted from a radiation source in a state in which a radiation detector is wound around an outer periphery of a welded portion of a steel pipe to be inspected and the radiation source is disposed on a central axis of the steel pipe, and a radiation transmission image generated by the radiation detector is acquired. In this non-destructive inspection, it is necessary to bend the radiation detector because the radiation detector is wound around the outer periphery of the steel pipe. Therefore, a flexible radiation detector is desired.

However, in the technique disclosed in WO2016/021540A, a flexible radiation detector may not be obtained because the partition wall interferes and the radiation detector cannot be sufficiently bent.

The present disclosure has been made in view of the above circumstances, and an object of the present disclosure is to provide a flexible radiation detector capable of obtaining a highly sharp radiation transmission image.

In order to achieve the above object, there is provided a radiation detector according to a first aspect of the present disclosure comprising: a scintillator that has a first surface on which radiation is incident and a second surface disposed on a side opposite to the first surface, and that converts the radiation into fluorescence; a sensor provided on a side of the second surface of the scintillator and having a light receiving surface that receives the fluorescence converted by the scintillator; and a plurality of members that reflect or absorb the fluorescence converted by the scintillator, in which each of the plurality of members has an elongated shape having a longitudinal direction in a direction intersecting the light receiving surface of the sensor, and is provided in the scintillator at a position closer to the second surface than to the first surface.

Further, in order to achieve the above object, there is provided a radiation detector according to a second aspect of the present disclosure comprising: a scintillator that has a first surface on which radiation is incident and a second surface disposed on a side opposite to the first surface, and that converts the radiation into fluorescence; a sensor provided on a side of the second surface of the scintillator and having a light receiving surface that receives the fluorescence converted by the scintillator; and a plurality of members that reflect or absorb the fluorescence converted by the scintillator, in which the scintillator and the sensor are bendable in a first direction, and each of the plurality of members has an elongated shape that is parallel to the light receiving surface and that has a longitudinal direction in a second direction intersecting the first direction, and is provided in the scintillator at a position closer to the second surface than to the first surface.

Further, in the radiation detector according to a third aspect of the present disclosure, in the radiation detector according to the first or second aspect, the sensor has a sensor unit provided for each of a plurality of pixels, and the plurality of members are disposed at an interval shorter than a pitch of the pixels.

Further, in the radiation detector according to a fourth aspect of the present disclosure, in the radiation detector according to any one of the first to third aspects, each of the plurality of members is provided in contact with the light receiving surface of the sensor.

Further, in the radiation detector according to a fifth aspect of the present disclosure, in the radiation detector according to any one of the first to fourth aspects, a length of each of the plurality of members in the direction intersecting the light receiving surface is equal to or greater than an interval between the plurality of members.

Further, in the radiation detector according to a sixth aspect of the present disclosure, in the radiation detector according to any one of the first to fifth aspects, a length of each of the plurality of members in the direction intersecting the light receiving surface is equal to or smaller than a length of the light receiving surface for each pixel.

Further, in the radiation detector according to a seventh aspect of the present disclosure, in the radiation detector according to any one of the first to sixth aspects, a plurality of granular fluorescent filter materials that are irradiated with the radiation to emit secondary electrons are provided in the scintillator on a side of the first surface.

According to the present disclosure, a radiation detector can be made flexible, and a highly sharp radiation transmission image can be obtained.

BRIEF DESCRIPTION OF THE DRAWINGS

Exemplary embodiments according to the technique of the present disclosure will be described in detail based on the following figures, wherein.

DETAILED DESCRIPTION

Hereinafter, exemplary embodiments of the technique according to the present disclosure will be described in detail with reference to the drawings.

First Embodiment

Figure 1:
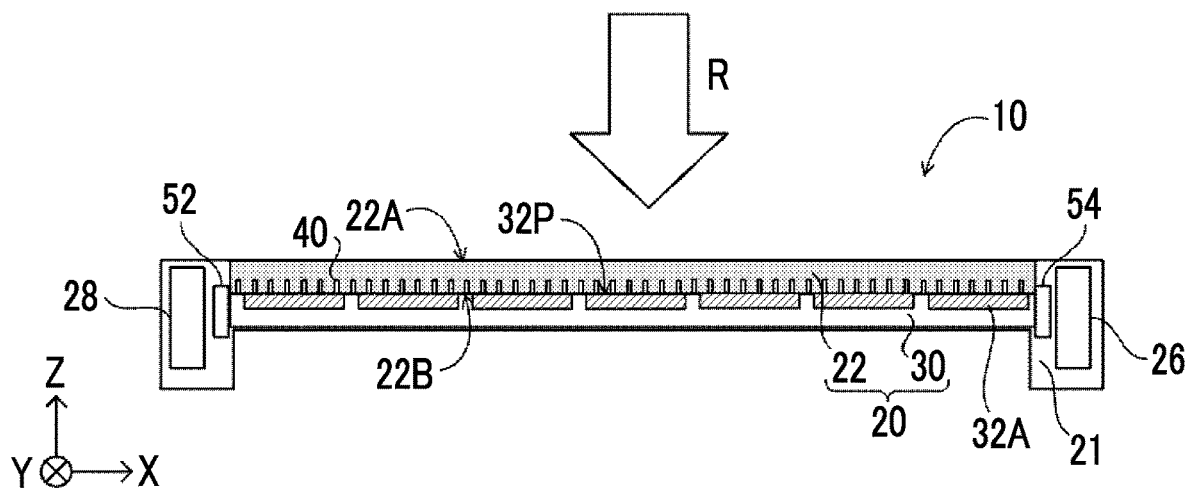
FIG. 1 is a side cross-sectional view showing an example of a configuration of a radiation transmission image capturing device of an embodiment.

First, the configuration of a radiation transmission image capturing device 10 of the present embodiment will be described with reference to FIG. 1. As shown in FIG. 1, the radiation transmission image capturing device 10 comprises a housing 21 through which radiation is transmitted, and a radiation detector 20 that detects radiation transmitted through an object to be inspected is provided in the housing 21. The radiation detector 20, which will be described in detail later, comprises a scintillator 22 that converts incident radiation R into fluorescence, and a sensor substrate 30 provided with a plurality of sensor units 32A that receive the fluorescence converted by the scintillator 22. In addition, a control substrate 26, a case 28, a gate wiring line driver 52, and a signal processing unit 54 are provided in the housing 21.

The case 28 and the gate wiring line driver 52 are provided on the opposite lateral side of the radiation detector 20 from the control substrate 26 and the signal processing unit 54 with the radiation detector 20 interposed therebetween. The case 28 and the gate wiring line driver 52, and the control substrate 26 and the signal processing unit 54 may be provided on the same lateral side of the radiation detector 20.

In the control substrate 26, electronic circuits such as an image memory 56, a controller 58, and a communication unit 66, which will be described later, are formed on the substrate. The case 28 accommodates a power supply unit 70, which will be described later, and the like.

Figure 2:
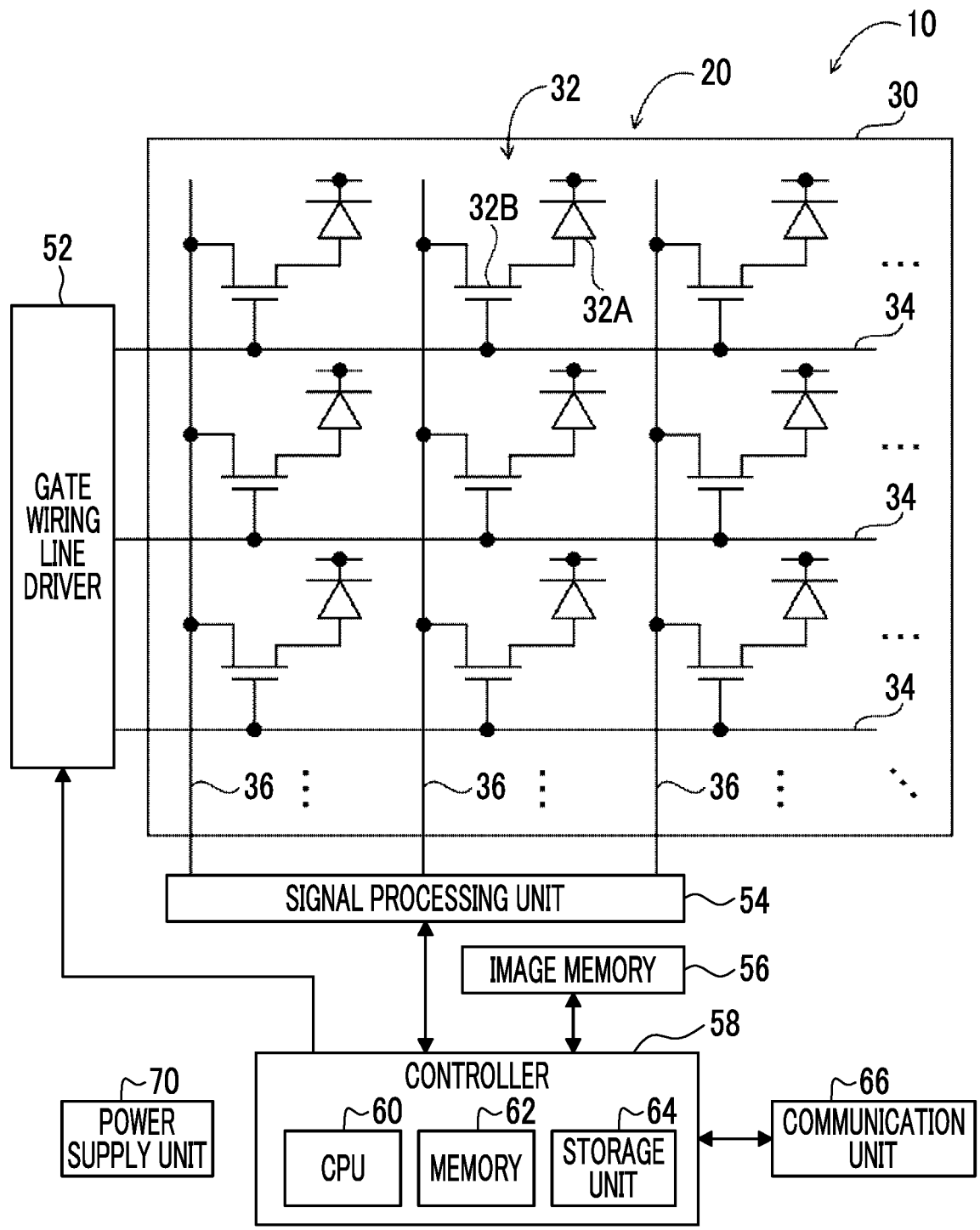
FIG. 2 is a block diagram showing an example of a configuration of main units of an electrical system of the radiation transmission image capturing device of the embodiment.

Next, the configuration of main units of an electrical system of the radiation transmission image capturing device 10 of the present embodiment will be described with reference to FIG. 2. As shown in FIG. 2, a plurality of pixels 32 are two-dimensionally provided on the sensor substrate 30 in one direction (a row direction in FIG. 2) and a cross direction (a column direction in FIG. 2) intersecting the one direction. The pixel 32 includes the above-mentioned sensor unit 32A and a field-effect thin film transistor (TFT, hereinafter simply referred to as a "thin film transistor") 32B. The sensor unit 32A of the present embodiment is an example of the sensor of the present disclosure.

The sensor unit 32A includes, for example, an upper electrode, a lower electrode, and a photoelectric conversion film, which are not shown, absorbs light emitted from the scintillator 22, generates electric charge, and accumulates the generated electric charge. The thin film transistor 32B converts the electric charge accumulated in the sensor unit 32A into electrical signals and outputs the electrical signals.

A plurality of gate wiring lines 34 that extend in the one direction and that are used to turn each thin film transistor 32B on and off are provided on the sensor substrate 30. In addition, a plurality of data wiring lines 36 that extend in the cross direction and that are used to read out the electric charge via the thin film transistors 32B in an on state are provided on the sensor substrate 30. Each gate wiring line 34 of the sensor substrate 30 is connected to the gate wiring line driver 52, and each data wiring line 36 of the sensor substrate 30 is connected to the signal processing unit 54.

The rows of the thin film transistors 32B of the sensor substrate 30 are sequentially turned on by the electrical signals supplied from the gate wiring line driver 52 via the gate wiring lines 34. Then, the electric charge read out by the thin film transistor 32B in an on state is transmitted as an electrical signal via the data wiring line 36 and is input to the signal processing unit 54. With this, the electric charge is sequentially read out from each row of the thin film transistors, and image data showing a two-dimensional radiation transmission image is acquired.

The signal processing unit 54 comprises, for each data wiring line 36, an amplification circuit that amplifies the input electrical signal, and a sample-and-hold circuit (both not shown), and the electrical signal transmitted via each data wiring line 36 is amplified by the amplification circuit and is then held by the sample-and-hold circuit. A multiplexer and an analog-to-digital (AD) converter are connected to an output side of the sample-and-hold circuit in this order. The electrical signals held by each sample-and-hold circuit are sequentially (serially) input to the multiplexer, and the electrical signals sequentially selected by the multiplexer are converted into digital image data by the AD converter.

The controller 58, which will be described later, is connected to the signal processing unit 54, and the image data output from the AD converter of the signal processing unit 54 is sequentially output to the controller 58. The image memory 56 is connected to the controller 58, and the image data sequentially output from the signal processing unit 54 is sequentially stored in the image memory 56 by the control of the controller 58. The image memory 56 has storage capacity capable of storing a predetermined amount of image data, and each time the radiation transmission image is captured, the image data obtained by capturing the radiation transmission image is sequentially stored in the image memory 56.

The controller 58 comprises a central processing unit (CPU) 60, a memory 62 including, for example, a read only memory (ROM) and a random access memory (RAM), and a non-volatile storage unit 64, such as a flash memory. An example of the controller 58 includes a microcomputer.

The communication unit 66 is connected to the controller 58 and transmits and receives various kinds of information to and from an external device via a communication means, such as wireless communication and wired communication. The power supply unit 70 supplies power to each element and the above-mentioned various circuits, such as the gate wiring line driver 52, the signal processing unit 54, the image memory 56, the controller 58, and the communication unit 66. In FIG. 2, in order to avoid complications, wiring lines for connecting the power supply unit 70 to the various circuits and each element are not shown.

Figure 3:
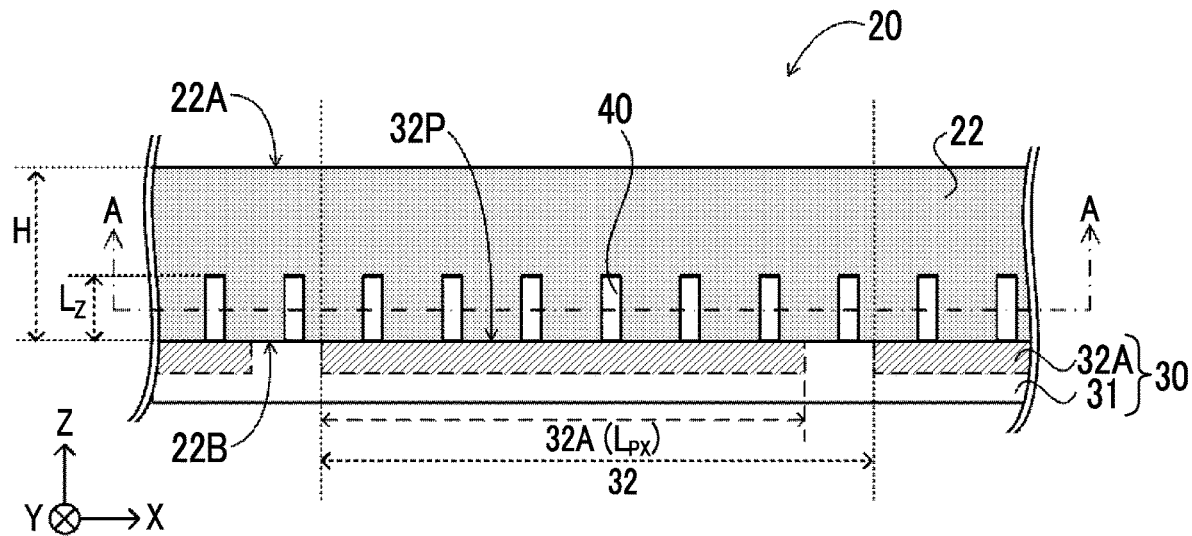
FIG. 3 is a side cross-sectional view showing an example of a configuration of a radiation detector of a first embodiment.
Figure 4:
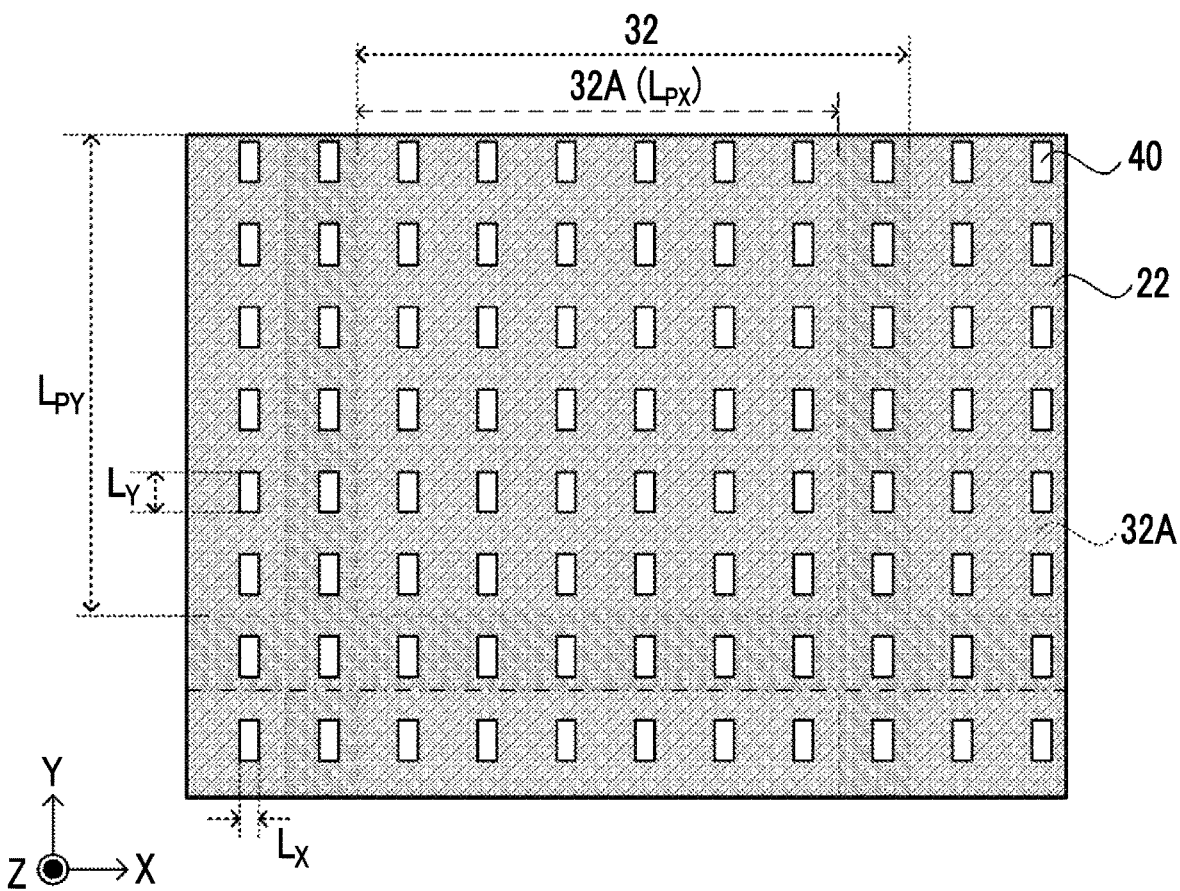
FIG. 4 is a cross-sectional view of the radiation detector taken along line A-A shown in FIG. 3 as viewed from an emission side of radiation.

Next, the configuration of the radiation detector 20 of the present embodiment will be described in detail with reference to FIGS. 3 and 4. FIG. 3 is a side cross-sectional view showing an example of the configuration of the radiation detector 20 of the present embodiment. FIG. 4 is a cross-sectional view of the radiation detector 20 taken along line A-A shown in FIG. 3 as viewed from an emission side of the radiation R. For convenience of description, FIG. 3 also shows the sensor substrate 30 and the sensor unit 32A under the scintillator 22.

As described above, the radiation detector 20 of the present embodiment comprises the scintillator 22 and the sensor substrate 30. Further, the scintillator 22 and the sensor substrate 30 are laminated in the order of the scintillator 22 and the sensor substrate 30 from an incidence side of the radiation R. That is, the radiation detector 20 is a penetration side sampling (PSS) type radiation detector in which the radiation R is emitted from the side of the scintillator 22 (see also FIG. 1).

Figure 5A:
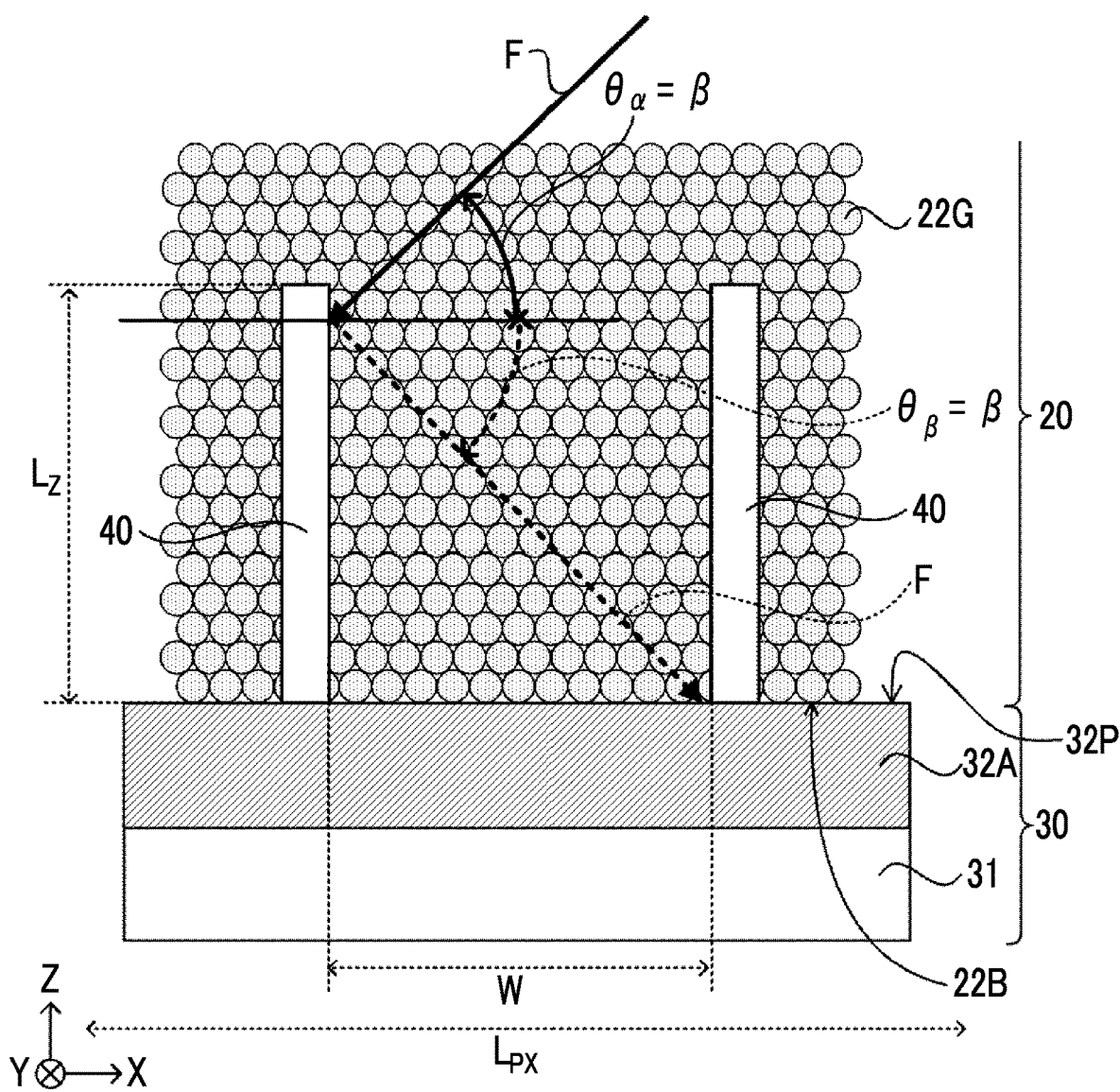
FIG. 5A is a view illustrating a maximum value of a length of a member in a longitudinal direction and a maximum value of an interval between members.

The scintillator 22 has a first surface 22A on which the radiation R is incident and a second surface 22B on a side opposite to the first surface 22A, and converts the radiation R into fluorescence. In the present embodiment, in a case where the term "upper" or "lower" is used for the radiation detector 20, the scintillator 22 is used as a reference. For example, the first surface 22A of the scintillator 22 is a surface disposed on the "upper" side of the scintillator 22, and the second surface 22B is a surface disposed on the "lower" side of the scintillator 22. Further, the scintillator 22 is provided on the sensor substrate 30. The scintillator 22 of the present embodiment is constituted of phosphors 22G (see FIGS. 5A and 5B) dispersed in a binder, such as a resin. In the present embodiment, gadolinium sulfate ($Gd_2O_2S$: Tb, GOS) 22G (see FIGS. 5A and 5B) is used as an example of the phosphor 22G.

As described above, the sensor substrate 30 includes a plurality of sensor units 32A corresponding to the respective pixels 32 provided on a base material 31. Each of the plurality of sensor units 32A is provided on the side of the second surface 22B of the scintillator 22 and has a light receiving surface 32P that receives the fluorescence converted by the scintillator 22. Meanwhile, the base material 31 is a resin sheet having flexibility and including, for example, a plastic such as a polyimide (PI). The thickness of the base material 31 of the sensor substrate 30 need only be a thickness capable of obtaining a desired flexibility according to the hardness of the material, the size of the sensor substrate 30, and the like. The thickness of the base material 31 need only be, for example, 5 µm to 125 µm and more preferably 20 µm to 50 µm. Specific examples of the base material 31 include XENOMAX (registered trademark).

Further, the radiation detector 20 of the present embodiment comprises a plurality of members 40 that reflect or absorb the fluorescence converted by the scintillator 22.

Each of the plurality of members 40 is provided in the scintillator 22 at a position closer to the second surface 22B than to the first surface 22A. In other words, each of the plurality of members 40 is provided in the scintillator 22 on the side of the second surface 22B. As shown in FIG. 3, as an example, each of the plurality of members 40 of the present embodiment is provided in contact with the light receiving surface 32P of the sensor unit 32A.

As described above, the scintillator 22 converts the radiation R into fluorescence. In the scintillator 22, the lower the energy of the radiation R is, the closer the position at which the radiation R is converted into fluorescence is to the first surface 22A on which the radiation R is incident. In other words, in the scintillator 22, the higher the energy of the radiation R is, the closer the position at which the radiation R is converted into fluorescence is to the second surface 22B. The fluorescence converted from the radiation R is emitted in all directions of 360 degrees and is attenuated in the process of reaching the sensor unit 32A. In the radiation detector 20 of the present embodiment, the member 40 that reflects or absorbs fluorescence is provided in the scintillator 22 at a position close to the sensor unit 32A, so that the fluorescence converted at the position close to the sensor unit 32A is restrained from being scattered and is guided to the sensor unit 32A.

Further, as shown in FIGS. 3 and 4, each of the plurality of members 40 has an elongated shape having a longitudinal direction in a Z-axis direction that is a direction intersecting the light receiving surface 32P of the sensor unit 32A. As an example, the member 40 of the present embodiment has a square pillar shape. In this case, a length $L_Z$ in the Z-axis direction, which is a length of the member 40 in the longitudinal direction, corresponds to a height of the square pillar. The longer the length $L_Z$ of the member 40 in the longitudinal direction is, the sharper the radiation transmission image obtained by the radiation detector 20 is, but the radiation detector 20 cannot be sufficiently bent or the member 40 may be destructed by bending the radiation detector 20 in a case where the length $L_Z$ of the member 40 in the longitudinal direction is the same as a thickness H of the scintillator 22. Therefore, the length $L_Z$ of the member 40 in the Z-axis direction is shorter than the thickness H of the scintillator 22, and is longer than each of a length $L_X$ in an X-axis direction and a length $L_Y$ in a Y-axis direction ($L_Z<H$, $L_Z>L_X$, and $L_Z>L_Y$).

The length $L_Z$ of the member 40 of the present embodiment in the longitudinal direction will be further described.

From the viewpoint of reflecting the fluorescence converted from the radiation R by the scintillator 22 via the member 40, the length $L_Z$ of the member 40 in the longitudinal direction can be determined as follows. First, with reference to FIG. 5A, the maximum value of the length $L_Z$ of the member 40 in the longitudinal direction and the maximum value of an interval W between the members 40 will be described. The maximum value of the length $L_Z$ of the member 40 in the longitudinal direction and the maximum value of the interval W between the members 40 are preferably determined according to the specular reflection of fluorescence F via the member 40. In order for the fluorescence F converted from the radiation R in the radiation detector 20 to be reflected by the member 40 and guided to the sensor unit 32A, the fluorescence F is specularly reflected by the member 40. In order for the fluorescence F to be specularly reflected, each of an incidence angle $\theta_\alpha$ and a reflection angle $\theta_\beta$ has to be smaller than 45°. Therefore, in the radiation detector 20 of the present embodiment, the length $L_Z$ of the member 40 in the longitudinal direction is set to be equal to or smaller than a length $L_{PX}$ of the sensor unit 32A ($L_Z \leq L_{PX}$) Further, in the radiation detector 20 of the present embodiment, the length $L_Z$ of the member 40 in the longitudinal direction is set to be equal to or greater than the interval W between the members 40 ($L_Z \geq W$). Since the plurality of members 40 are disposed at an interval shorter than a pitch of the pixels 32, the interval W between the members 40 is equal to or smaller than the length $L_{PX}$ of the sensor unit 32A ($W \leq L_{PX}$).

Figure 5B:
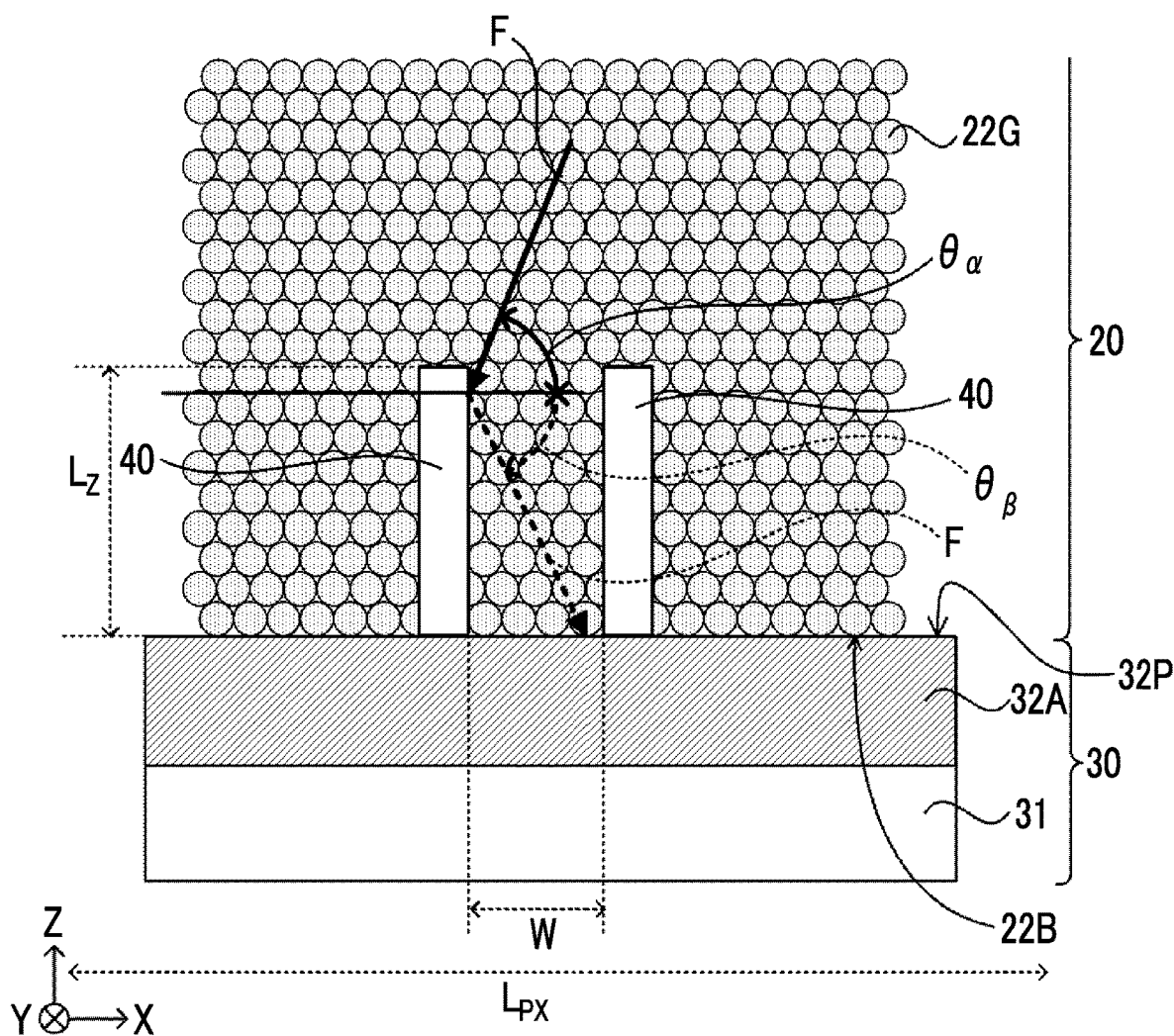
FIG. 5B is a view illustrating a minimum value of a length of the member in the longitudinal direction and a minimum value of the interval between the members.

Next, with reference to FIG. 5B, the minimum value of the length $L_Z$ of the member 40 in the longitudinal direction and the minimum value of the interval W between the members 40 will be described. The minimum value of the length $L_Z$ of the member 40 in the longitudinal direction and the minimum value of the interval W between the members 40 are preferably determined according to the Fresnel reflection between the phosphor 22G and the member 40. The total reflection in the Fresnel reflection depends on a Brewster's angle $\beta$ determined by the refractive index of the phosphor 22G and the binder (hereinafter referred to as a "first refractive index") and by the refractive index of the member 40 (hereinafter referred to as a "second refractive index"). Therefore, the minimum value of the length $L_Z$ of the member 40 in the longitudinal direction and the minimum value of the interval W between the members 40 preferably satisfy Equation (1) in which each of the incidence angle $\theta_\alpha$ and the reflection angle $\theta_\beta$ is set to the Brewster's angle $\beta$. The Brewster's angle $\beta$ in the member 40 of the present embodiment is 60° to 70° in a case where the first refractive index is relatively smaller than the second refractive index (first refractive index<second refractive index).

$$W \geq L_Z \times 1/\tan \beta \quad (1)$$

Figure 6A:
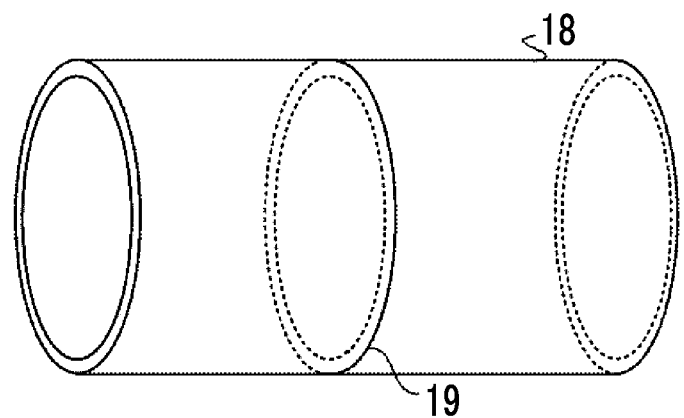
FIG. 6A is a view illustrating an object to be inspected and a portion to be inspected of the embodiment.
Figure 6B:
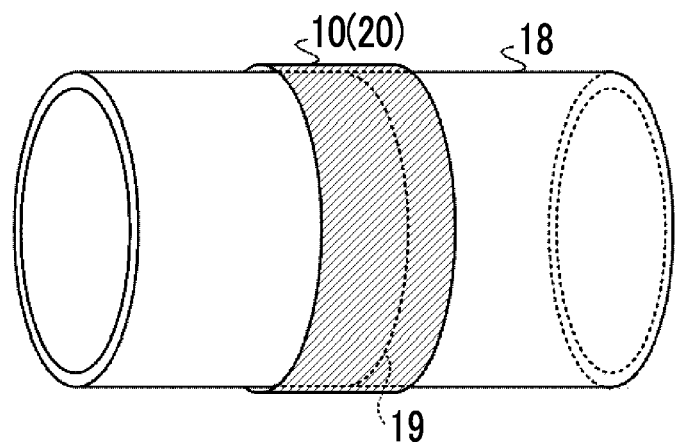
FIG. 6B is a view showing an example of a state in which the radiation transmission image capturing device of the embodiment is provided on the object to be inspected.
Figure 7:
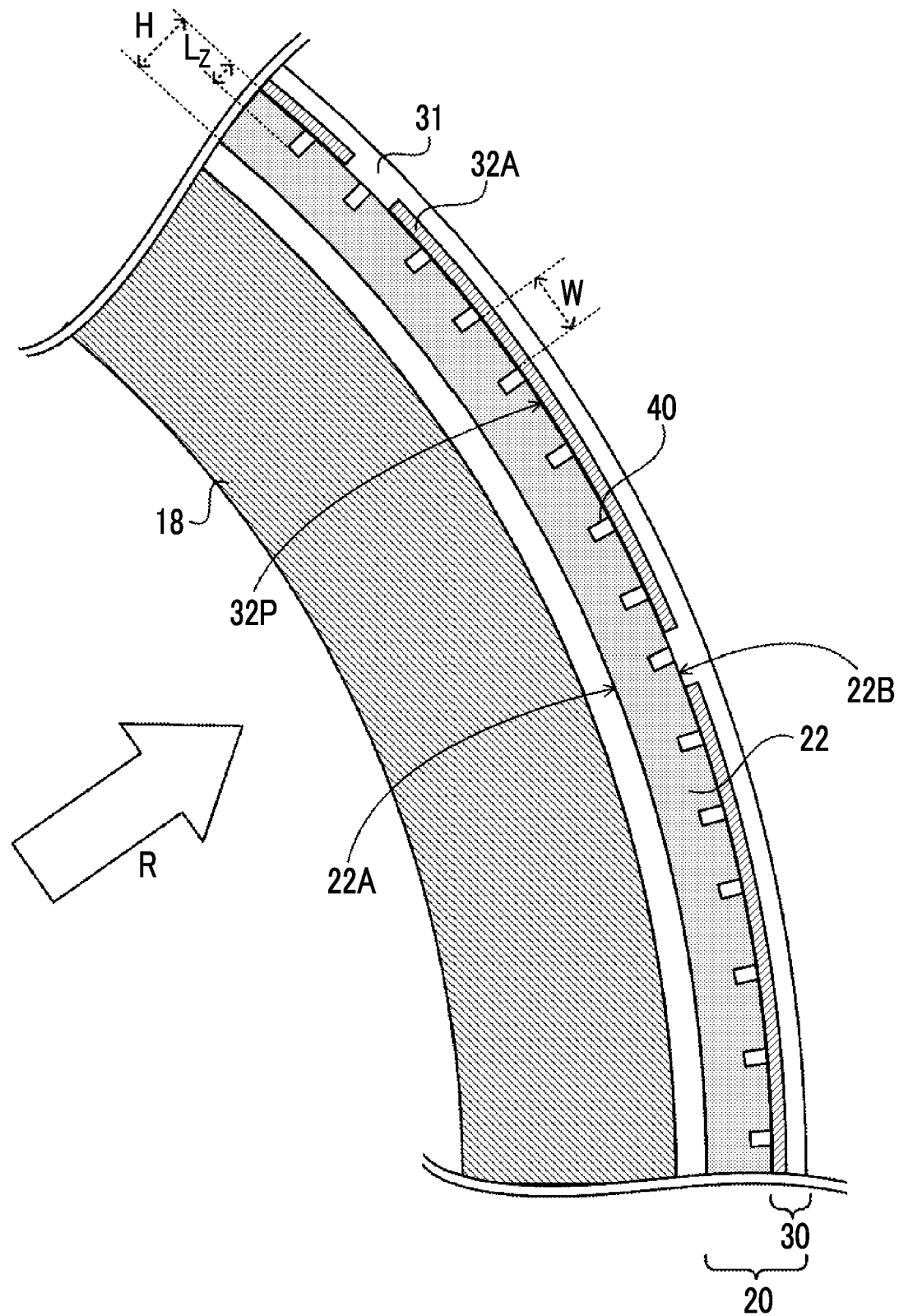
FIG. 7 is a view illustrating an example of the length of the member in the longitudinal direction in a state in which the radiation detector is bent along the object to be inspected.

Further, from the viewpoint of bending the radiation detector 20, the length $L_Z$ of the member 40 in the longitudinal direction is determined as follows. As shown in FIG. 6A as an example, in a case where an object to be inspected 18 for the non-destructive inspection is, for example, a cylindrical object, such as a pipe of a natural gas pipeline, and a portion to be inspected 19 is a welded portion of two pipes, the radiation transmission image capturing device 10 is wound in a state of being bent along the outer shape of the object to be inspected 18, as shown in FIG. 6B. In other words, the radiation transmission image capturing device 10 of the present embodiment captures the radiation transmission image of the portion to be inspected 19 in a state of being wound around the object to be inspected 18. As shown in FIG. 7, as the radiation transmission image capturing device 10 is bent, the radiation detector 20 is also bent. Therefore, the length $L_Z$ of the member 40 in the longitudinal direction and the interval W between the members 40 are each set to a value that allows the radiation detector 20 to be bent according to the object to be inspected 18. At least, the length $L_Z$ of the member 40 in the longitudinal direction is shorter than the thickness H of the scintillator 22. Further, it is preferable to determine the length $L_Z$ of the member 40 in the longitudinal direction and the interval W between the members 40 such that, for example, tip ends of the member 40 do not come into contact with each other in a state in which the radiation detector 20 is bent.

As described above, it is preferable to determine the length $L_Z$ of the member 40 in the longitudinal direction and the interval W between the members 40 in comprehensive consideration of two viewpoints of the viewpoint of reflection of the fluorescence F via the member 40 and the viewpoint of bending the radiation detector 20.

Further, as described above, the plurality of members 40 exist in the sensor unit 32A. Since a region of the sensor unit 32A where the member 40 and the light receiving surface 32P are in contact with each other does not receive the fluorescence F, the opening ratio of the sensor unit 32A, in other words, a light receiving region of the sensor unit 32A, depends on an area of the sensor unit 32A covered by the member 40. Therefore, it is preferable to determine the number of members 40 existing in the sensor unit 32A, that is, the density of the members 40 according to the desired sensitivity of the sensor unit 32A. For example, in a case where the object to be inspected 18 is a steel pipe, the area of the sensor unit 32A covered by the member 40 is preferably 50% or less of the area of the light receiving surface 32P of the sensor unit 32A. Specifically, the value obtained by multiplying the product of the length $L_X$ and the length $L_Y$ of the member 40 by the number n of the members 40 existing in the sensor unit 32A is preferably a value equal to or less than ½ of the area ($L_{PX} \times L_{PY}$) of the light receiving surface 32P ($L_X \times L_Y \times n \leq L_{PX} \times L_{PY} \times ½$). The opening ratio of the sensor unit 32A in each of the plurality of pixels 32 may differ depending on the disposition state of the member 40. That is, a difference in sensitivity may occur between the pixels 32. In such a case, the controller 58 or the like need only perform correction processing on the radiation transmission image obtained by the radiation detector 20 to correct the difference in sensitivity.

As described above, the material for forming the above-mentioned member 40 may be any member having the second refractive index capable of causing Fresnel reflection in the member 40, and examples of the material include a siloxane resin, silica particles, and a surfactant. In the Fresnel reflection of the member 40, since a component in a direction other than the direction of the sensor substrate 30 is scattered light and is not directly incident on the sensor substrate 30, the scattered light can be ignored. Further, regarding the surface roughness of the member 40, since it is considered that Fresnel reflection occurs in a case where the surface of the member 40 is smooth and that scattering occurs in a case where the surface thereof is rough, and the scattered light is not directly incident on the sensor substrate 30 as described above in a case where scattering occurs, the scattered light can be ignored.

The method for manufacturing the radiation detector 20 according to the present embodiment is not particularly limited. For example, the sensor substrate 30 provided with the sensor unit 32A, a sheet material provided with the plurality of members 40, and a sheet material of the scintillator 22 coated with the phosphor 22G are prepared. Further, the radiation detector 20 may be manufactured by sequentially laminating the sheet material provided with the members 40 and the sheet material of the scintillator 22 coated with the phosphor 22G, on the sensor substrate 30. Alternatively, for example, the plurality of members 40 are formed, via coating, on the sensor substrate 30 provided with the sensor unit 32A. Then, the radiation detector 20 may be manufactured by applying the phosphor 22G on the sensor substrate 30 on which the plurality of members 40 are formed to form the scintillator 22.

As described above, the radiation detector 20 of the present embodiment comprises the scintillator 22 that has the first surface 22A on which the radiation R is incident and the second surface 22B disposed on the side opposite to the first surface 22A, and that converts the radiation R into the fluorescence F; the sensor unit 32A provided on the side of the second surface 22B of the scintillator 22 and having the light receiving surface 32P that receives the fluorescence F converted by the scintillator 22; and the plurality of members 40 that reflect or absorb the fluorescence F converted by the scintillator 22. Each of the plurality of members 40 has an elongated shape having the longitudinal direction in the Z-axis direction intersecting the light receiving surface 32P of the sensor unit 32A, and is provided in the scintillator 22 at a position closer to the second surface 22B than to the first surface 22A.

In the radiation detector 20 of the present embodiment, since each of the plurality of members 40 that reflect or absorb the fluorescence F is provided in the scintillator 22, and the fluorescence F can be guided to the light receiving surface 32P of the sensor unit 32A by being reflected by the member 40, a highly sharp radiation transmission image can be obtained. Further, since each of the plurality of members 40 has an elongated shape having the longitudinal direction in the Z-axis direction intersecting the light receiving surface 32P of the sensor unit 32A, and is provided in the scintillator 22 at a position closer to the second surface 22B than to the first surface 22A, the radiation detector can be made flexible. Specifically, the radiation detector 20 of the present embodiment can be bent in both the X-axis direction and the Y-axis direction. Further, it is possible to restrain the member 40 from being destructed even in a case of bending the radiation detector 20. Accordingly, with the radiation detector 20 according to the present embodiment, the radiation detector can be made flexible, and a highly sharp radiation transmission image can be obtained.

In the radiation detector 20 of the present embodiment, since the length $L_X$ of the member 40 in the X-axis direction is sufficiently shorter than the length $L_{PX}$ of the sensor unit 32A in the X-axis direction, and the length $L_Y$ of the member 40 in the Y-axis direction is sufficiently shorter than a length $L_{PY}$ of the sensor unit 32A in the Y-axis direction, the radiation detector 20 can be easily bent in both the X-axis direction and the Y-axis direction. That is, the radiation detector 20 of the present embodiment has no limitation in the direction in which the radiation detector 20 is bent. In order to increase the degree of freedom in the direction in which the radiation detector 20 is bent, it is preferable that the difference between the length $L_X$ in the X-axis direction and the length $L_Y$ in the Y-axis direction of the member 40 is relatively small.

Further, in the radiation detector 20 of the present embodiment, the plurality of members 40 are disposed at the interval shorter than the pitch of the pixels 32. Specifically, the interval W between the members 40 is shorter than the length $L_{PX}$ of the sensor unit 32A. Therefore, it is not necessary to align the pixel 32 with the member 40.

In the present embodiment, an aspect has been described in which the shape of the member 40 is a square pillar having a rectangular cross-sectional shape in the XY plane, but the shape of the member 40 is not limited to this aspect. For example, the shape of the member 40 may be a square pillar having a square cross-section or a cylinder having a circular cross-section.

Second Embodiment

Figure 8:
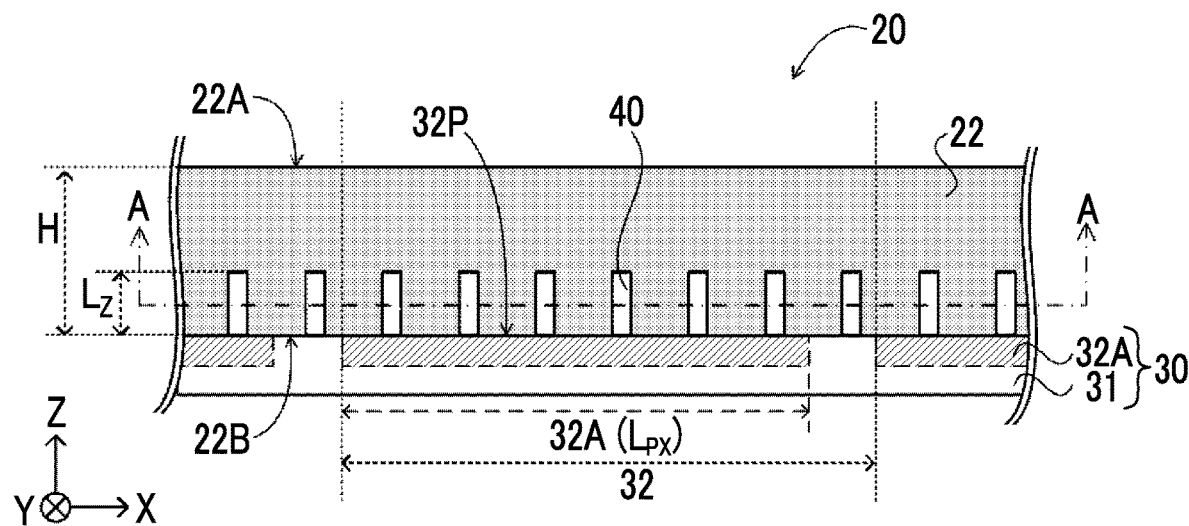
FIG. 8 is a side cross-sectional view showing an example of a configuration of a radiation detector of a second embodiment.
Figure 9:
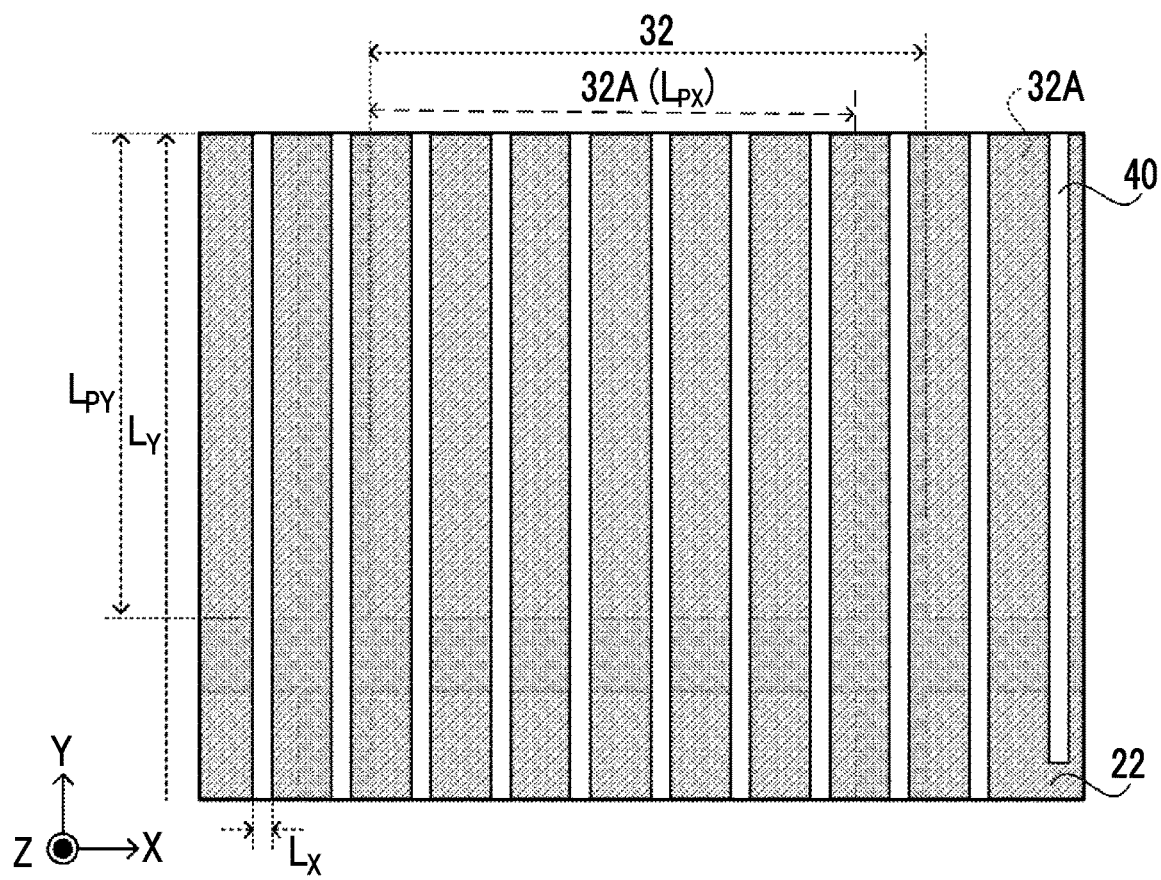
FIG. 9 is a cross-sectional view of the radiation detector taken along line A-A shown in FIG. 8 as viewed from the emission side of radiation.

In the present embodiment, another embodiment of the radiation detector 20 will be described. FIG. 8 is a side cross-sectional view showing an example of the configuration of the radiation detector 20 of the present embodiment. FIG. 9 is a cross-sectional view of the radiation detector 20 taken along line A-A shown in FIG. 8 as viewed from the emission side of the radiation R. For convenience of description, FIG. 9 also shows the sensor substrate 30 and the sensor unit 32A under the radiation detector 20.

As shown in FIGS. 8 and 9, in the present embodiment, the radiation detector 20 can be bent in the X-axis direction, and each of the plurality of members 40 has an elongated shape that is parallel to the light receiving surface 32P and that has the longitudinal direction in the Y-axis direction intersecting the X-axis direction. That is, the member 40 of the first embodiment has an elongated shape having the longitudinal direction in the Z-axis direction, whereas the member 40 of the present embodiment has an elongated shape having the longitudinal direction in the Y-axis direction intersecting the X-axis direction. The X-axis direction of the present embodiment is an example of a first direction of the present disclosure, and the Y-axis direction of the present embodiment is an example of a second direction of the present disclosure.

Specifically, as shown in FIG. 8, the shape of the side cross-section of each of the plurality of members 40 of the present embodiment, that is, the shape in the XZ plane, is the same as the shape of the side cross-section of each of the plurality of members 40 of the first embodiment (see FIG. 3).

On the other hand, as shown in FIG. 9, each of the plurality of members 40 of the present embodiment has a shape different from the member 40 of the first embodiment (see FIG. 4). The length $L_Y$ of each member 40 of the present embodiment in the Y-axis direction is longer than the length $L_{PY}$ of the pixel 32 in the Y-axis direction ($L_Y > L_{PY}$). As an example, in the present embodiment, the length $L_Y$ of each member 40 in the Y-axis direction is the same as the length of the scintillator 22 in the Y-axis direction. The length of each member 40 in the Y-axis direction is not limited thereto.

As described above, in the present embodiment, each of the plurality of members 40 has an elongated shape having the longitudinal direction in the Y-axis direction. In other words, in the present embodiment, the plurality of members 40 are disposed substantially in parallel to each other in a state of extending in the Y-axis direction. Accordingly, in the radiation detector 20 of the present embodiment, the radiation detector 20 can be bent in the X-axis direction regardless of the length $L_Y$ of the member 40 in the Y-axis direction. In other words, the above-mentioned Y-axis direction in the radiation detector 20 is made a direction along an axial direction of the steel pipe that is the object to be inspected 18, so that the radiation detector 20 can be bent and wound around the object to be inspected 18.

The length $L_Z$ in the Z-axis direction, the interval W between the members 40, and the like in each of the plurality of members 40 of the present embodiment need only be the same as the length $L_Z$ in the Z-axis direction, the interval W between the members 40, and the like in each of the plurality of members 40 in the first embodiment, respectively.

As described above, the radiation detector 20 of the present embodiment comprises the scintillator 22 that has the first surface 22A on which the radiation R is incident and the second surface 22B disposed on the side opposite to the first surface 22A, and that converts the radiation R into the fluorescence F; the sensor unit 32A provided on the side of the second surface 22B of the scintillator 22 and having the light receiving surface 32P that receives the fluorescence F converted by the scintillator 22; and the plurality of members 40 that reflect or absorb the fluorescence F converted by the scintillator 22. Further, the scintillator 22 and the sensor unit 32A can be bent in the X-axis direction. Each of the plurality of members 40 has an elongated shape that is parallel to the light receiving surface 32P and that has the longitudinal direction in the Y-axis direction intersecting the X-axis direction, and is provided in the scintillator 22 at a position closer to the second surface 22B than to the first surface 22A.

In the radiation detector 20 of the present embodiment, since each of the plurality of members 40 that reflect or absorb the fluorescence F is provided in the scintillator 22, and the fluorescence F can be guided to the light receiving surface 32P of the sensor unit 32A by being reflected by the member 40, a highly sharp radiation transmission image can be obtained. Further, since each of the plurality of members 40 has an elongated shape that is parallel to the light receiving surface 32P and that has the longitudinal direction in the Y-axis direction intersecting the X-axis direction, and is provided in the scintillator 22 at a position closer to the second surface 22B than to the first surface 22A, the radiation detector can be made flexible and be bent in the X-axis direction. Further, it is possible to restrain the member 40 from being destructed even in a case of bending the radiation detector 20. Accordingly, with the radiation detector 20 according to the present embodiment, the radiation detector can be made flexible, and a highly sharp radiation transmission image can be obtained.

With the member 40 of the radiation detector 20 of the present embodiment, the direction in which the radiation detector 20 is bent is limited because the length $L_Y$ in the Y-axis direction can be made sufficiently long, but the sharpness of the radiation transmission image can be further increased.

The radiation detector 20 and the member 40 may adopt, for example, aspects of the following modification examples 1 to 3.

Modification Example 1

Figure 10:
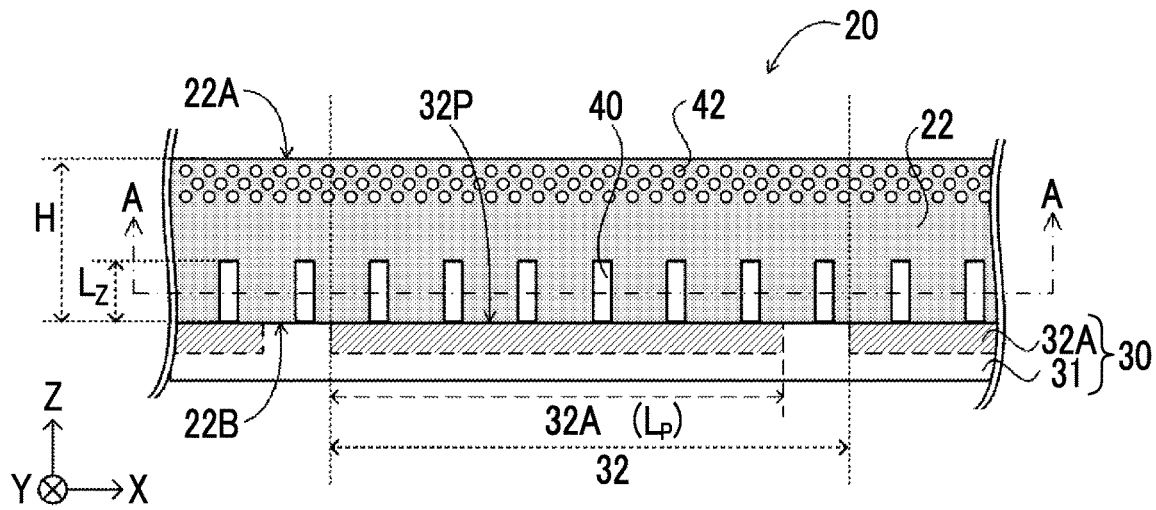
FIG. 10 is a side cross-sectional view showing an example of a configuration of a radiation detector of a modification example 1.

FIG. 10 is a side cross-sectional view showing an example of the configuration of the radiation detector 20 of the present modification example. In the radiation detector 20 of the present modification example shown in FIG. 10, a plurality of granular fluorescent filter materials 42 that are irradiated with the radiation R to emit secondary electrons are provided in the scintillator 22 on the side of the first surface 22A.

In a case where the fluorescent filter material 42 is irradiated with radiation R, the fluorescent filter material 42 emits secondary electrons (recoil electrons) from the surface of the fluorescent filter material 42 because of Compton scattering. In the scintillator 22, the sensitivity is improved by the sensitization action of the secondary electrons emitted by the fluorescent filter material 42. In other words, the fluorescent filter material 42 functions as an activating substance in the scintillator 22. In the present modification example, since the fluorescent filter material 42 is provided in the scintillator 22 on the side of the first surface 22A, the sensitivity of the portion of the scintillator 22 on the side of the first surface 22A can be improved. Therefore, the radiation transmission image obtained by the radiation detector 20 can be made into a sharper image. Further, since the fluorescent filter material 42 can restrain the fluorescence F converted by the scintillator 22 from being scattered, the radiation transmission image obtained by the radiation detector 20 can be made into a sharper image.

Examples of such a fluorescent filter material 42 include metal compounds and metals, such as lead (Pb), copper (Cu), tungsten (W), tantalum (Ta), steel, stainless steel, brass, aluminum (Al), nickel (Ni), cobalt (Co), silver (Ag), gold (Au), and platinum (Pt), in addition to terbium (Tb), dysprosium (Dy), and cesium (Cs) as preferable examples thereof.

As described above, in the radiation detector 20 of the present embodiment, for example, a scintillator that includes the fluorescent filter material 42 functioning as an activating substance for a gadolinium sulfate (GOS) phosphor ($Gd_2O_2S$: Tb) can be used as the scintillator 22.

Modification Example 2

Figure 11:
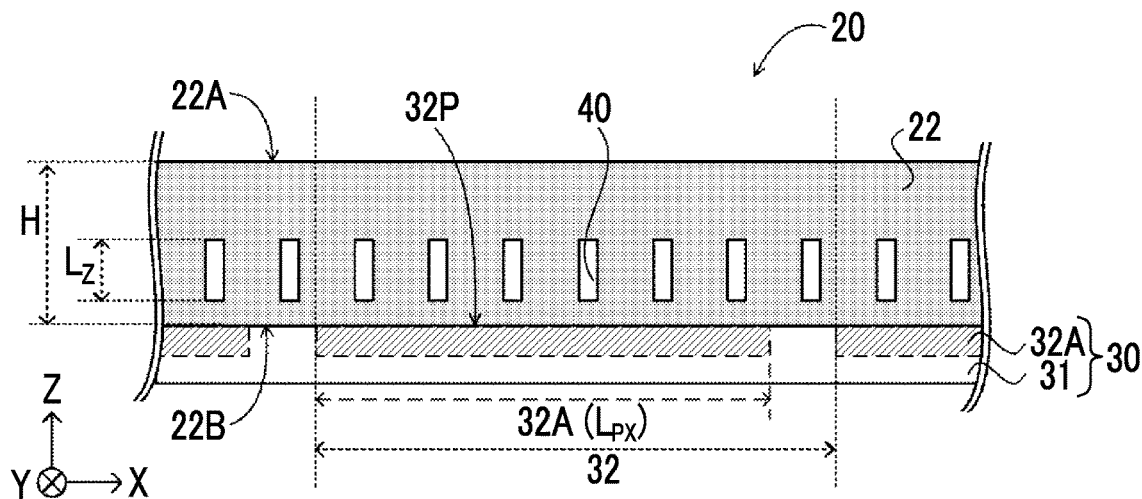
FIG. 11 is a side cross-sectional view showing an example of a configuration of a radiation detector of a modification example 2.

FIG. 11 is a side cross-sectional view showing an example of the configuration of the radiation detector 20 of the present modification example. In the present modification example as shown in FIG. 11, the position in the Z-axis direction where each of the plurality of members 40 is provided is different from the position in each of the above aspects. In each of the above aspects, each of the plurality of members 40 is provided in contact with the light receiving surface 32P of the sensor unit 32A. On the other hand, each of the plurality of members 40 of the present modification example is not in contact with the light receiving surface 32P of the sensor unit 32A. In the present modification example, each of the plurality of members 40 is also provided in the scintillator 22 at a position closer to the second surface 22B than to the first surface 22A. Specifically, a central position of the length $L_Z$ of the member 40 in the Z-axis direction is closer to the sensor unit 32A than to the central position of the thickness H of the scintillator 22.

In this way, each of the plurality of members 40 is provided in the scintillator 22 at a position closer to the second surface 22B than to the first surface 22A even in a case where each of the plurality of members 40 is provided in a state of not being in contact with the light receiving surface 32P of the sensor unit 32A, so that a sharper image can be obtained with the radiation detector 20 of the present modification example, as in each of the above aspects. Further, each of the plurality of members 40 is made to have the shape of the member 40 of the first embodiment or the shape of the member 40 of the second embodiment, so that the radiation detector 20 can be made flexible.

In a case where the radiation detector 20 is bent, the interface between the member 40 and the sensor unit 32A (sensor substrate 32), that is, the light receiving surface 32P, may be distorted. In such a case, the member 40 is provided in a state of not being in contact with the light receiving surface 32P of the sensor unit 32A, so that it is possible to restrain the member 40 from being destructed due to the generated distortion.

Modification Example 3

Figure 12:
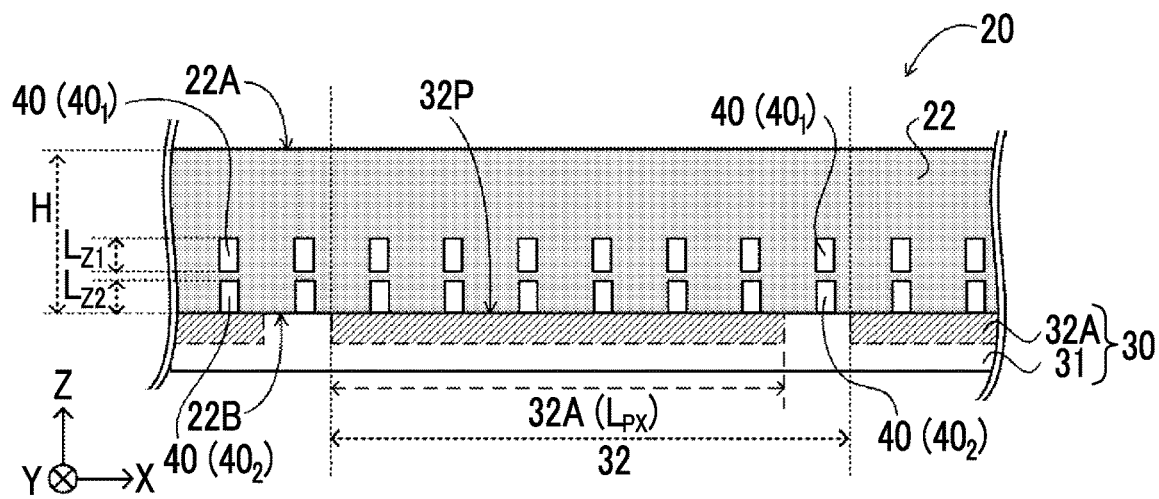
FIG. 12 is a side cross-sectional view showing an example of a configuration of a radiation detector of a modification example 3.

FIG. 12 is a side cross-sectional view showing an example of the configuration of the radiation detector 20 of the present modification example. In the radiation detector 20 of the present modification example, the plurality of members 40 are disposed side by side in the scintillator 22 in the X-axis direction. That is, two-row members 40 are provided in the scintillator 22. In the radiation detector 20 shown in FIG. 12, the members 40 including a plurality of members $40_1$ provided in the scintillator 22 on a side close to the first surface 22A and a plurality of members $40_2$ provided on a side close to the second surface 22B are provided.

In the case of this aspect, each of the plurality of members $40_1$ is also provided in the scintillator 22 at a position closer to the second surface 22B than to the first surface 22A. Specifically, the central position of a length $L_{Z1}$ of the member $40_1$ in the Z-axis direction is closer to the sensor unit 32A than to the central position of the thickness H of the scintillator 22.

The length $L_{Z1}$ of the member $40_1$ in the Z-axis direction and a length $L_{Z2}$ of the member $40_2$ in the Z-axis direction may be the same as or different from each other. The length obtained by adding the length $L_{Z1}$ of the member $40_1$ in the Z-axis direction and the length $L_{Z2}$ of the member $40_2$ in the Z-axis direction in the present modification example can be regarded as corresponding to the length $L_Z$ of the member 40 of each of the above aspects in the Z-axis direction.

In this way, each of the plurality of members 40 is provided in the scintillator 22 at a position closer to the second surface 22B than to the first surface 22A even in a case where the plurality of members 40 are provided in a plurality of rows in the scintillator 22, so that a sharper image can be obtained with the radiation detector 20 of the present modification example, as in each of the above aspects. Further, each of the plurality of members 40 is made to have the shape of the member 40 of the first embodiment or the shape of the member 40 of the second embodiment, so that the radiation detector 20 can be made flexible.

As described above, with the radiation detector 20 according to the present disclosure, the radiation detector can be made flexible, and a highly sharp radiation transmission image can be obtained.

The radiation detector 20 and the member 40 are not limited to the above first and second embodiments and the above modification examples 1 to 3. Further, for example, an aspect may be adopted in which the above first and second embodiments and the above modification examples 1 to 3 are appropriately combined. Further, in the first embodiment, an aspect has been described in which the plurality of members 40 are lined up and disposed in the X-axis direction and the Y-axis direction, but an aspect may be adopted in which the plurality of members 40 are randomly disposed.

Further, in the present embodiment, a case where the PSS type radiation detector in which radiation is emitted from the side of the scintillator 22 is applied to the radiation detector 20 has been described, but the present disclosure is not limited thereto. For example, an aspect may be adopted in which an irradiation side sampling (ISS) type radiation detector in which radiation is emitted from the side of the sensor substrate 30 is applied to the radiation detector 20.

Further, in the present embodiment, a case where an indirect conversion type radiation detector that temporarily converts radiation into light and then converts the converted light into electric charge is applied to the radiation detector 20 has been described, but the present disclosure is not limited thereto. For example, an aspect may be adopted in which a direct conversion type radiation detector that directly converts radiation into electric charge is applied to the radiation detector 20.

What is claimed is:

1. A radiation detector comprising:
a scintillator that has a first surface on which radiation is incident and a second surface disposed on a side opposite to the first surface, and that converts the radiation into fluorescence;
a sensor provided on a side of the second surface of the scintillator and having a light receiving surface that receives the fluorescence converted by the scintillator; and
a plurality of members that reflect or absorb the fluorescence converted by the scintillator,
wherein each of the plurality of members has an elongated shape having a longitudinal direction in a direction intersecting the light receiving surface of the sensor, and is provided in the scintillator at a position closer to the second surface than to the first surface.

2. A radiation detector comprising:
a scintillator that has a first surface on which radiation is incident and a second surface disposed on a side opposite to the first surface, and that converts the radiation into fluorescence;
a sensor provided on a side of the second surface of the scintillator and having a light receiving surface that receives the fluorescence converted by the scintillator; and
a plurality of members that reflect or absorb the fluorescence converted by the scintillator,
wherein the scintillator and the sensor are bendable in a first direction, and
each of the plurality of members has an elongated shape that is parallel to the light receiving surface and that has a longitudinal direction in a second direction intersecting the first direction, and is provided in the scintillator at a position closer to the second surface than to the first surface.

3. The radiation detector according to claim 1,
wherein the sensor has a sensor unit provided for each of a plurality of pixels, and
the plurality of members are disposed at an interval shorter than a pitch of the pixels.

4. The radiation detector according to claim 1,
wherein each of the plurality of members is provided in contact with the light receiving surface of the sensor.

5. The radiation detector according to claim 1,
wherein a length of each of the plurality of members in the direction intersecting the light receiving surface is equal to or greater than an interval between the plurality of members.

6. The radiation detector according to claim 1,
wherein a length of each of the plurality of members in the direction intersecting the light receiving surface is equal to or smaller than a length of the light receiving surface for each pixel.

7. The radiation detector according to claim 1,
wherein a plurality of granular fluorescent filter materials that are irradiated with the radiation to emit secondary electrons are provided in the scintillator on a side of the first surface.

* * * * *